Dec. 10, 1963 W. A. ANDRES ETAL 3,113,329
TAPPING SPINDLE CONSTRUCTION FOR USE IN
MULTIPLE SPINDLE TAPPING MACHINES
Filed May 25, 1960 2 Sheets-Sheet 1

INVENTOR.
WILLIAM A. ANDRES
BY JEROME F. MILLER

ATTORNEYS

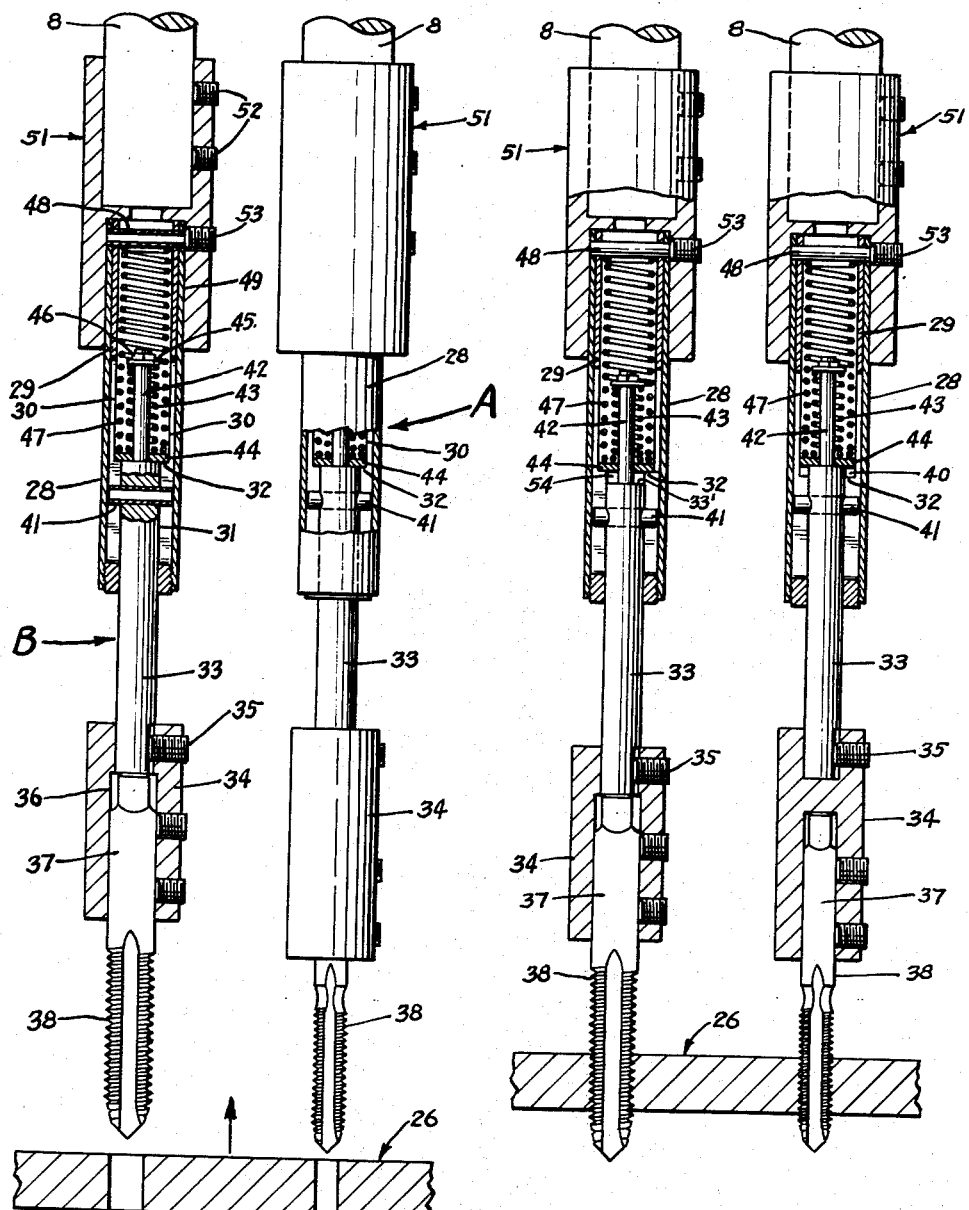

United States Patent Office 3,113,329
Patented Dec. 10, 1963

3,113,329
TAPPING SPINDLE CONSTRUCTION FOR USE IN MULTIPLE SPINDLE TAPPING MACHINES
William A. Andres, Hopkins, and Jerome F. Miller, Mound, Minn., assignors to Washington Scientific Industries, Inc., a corporation of Minnesota
Filed May 25, 1960, Ser. No. 31,630
3 Claims. (Cl. 10—129)

The present invention relates to new and useful improvements in multiple spindle drilling and tapping machines of the type comprising a tool driving head having a plurality of tool supporting spindles mounted therein, and having means for simultaneously driving all of said spindles; and a work supporting table for feeding the work into or out of operative engagement with the tools supported on said spindles, thereby to simultaneously perform a plurality of predetermined work operations.

Multiple spindle drilling and tapping machines, as now commonly constructed, are suitable for simultaneously drilling a plurality of holes in a given work piece, even when the holes are of different diameters. They are not, however, capable of simultaneously tapping a plurality of holes having varying pitch threads as, for example, a 14–24 thread, a 24–16 thread, etc., whereby the feeding movement of the different taps through the work piece may vary due to variations in the pitch or leads of the threads being cut. It is therefore highly desirable that means be provided whereby such machines may be utilized for simultaneously tapping a plurality of holes of different diameters having varying thread leads.

An important object of the present invention therefore is to provide an improved tap driving device which, to simplify explanation, will hereinafter be referred to as a "tap driver assembly." Each such assembly comprises an elongated tap supporting element having means at one end for detachably securing a tool thereto, such as a conventional tap. The other end of said member is non-rotatably mounted in a tubular driving member or housing having means at its upper end for detachably securing it to one of the usual drive spindles of a multiple spindle tapping machine; said tubular housing having means embodied therein for permitting relative axial movement of the tap supporting element therein during each tapping or thread cutting operation, whereby when two or more tap driver assemblies are operated simultaneously at a given speed to tap a plurality of holes having different thread pitches, the axial feeding movement of each tap into the work during each multiple thread cutting operation may vary independently of one another in accordance with the pitch or leads of the different threads being cut.

Another and more specific object of the invention is to provide a tap driver assembly comprising a tubular housing having one end secured in a suitable fitting or coupling member for detachably securing the tap driver assembly to one of the usual driving spindles of a tapping machine, said housing having a sleeve fixedly mounted therein and provided at its lower end with an axial guide bore adapted to slidably receive an elongated tap supporting element; and means within said sleeve for constantly urging the tap supporting element downwardly to yieldably hold its tap in thread cutting engagement with the work piece, when initially starting each tapping operation.

A further object of the invention is to provide a tap driver assembly of the class described comprising a tubular body having an elongated tap supporting element mounted for relative axial movement therein adapted to yieldably hold a tap in tapping engagement with the work; and means in said tap driver assembly whereby when two or more such assemblies are utilized for simultaneously tapping a plurality of holes in a given work piece, the threads of which may vary in size and pitch or lead, the tap driver assembly supporting the tap with the coarser thread may move axially into the work at a relatively faster speed than an adjacent smaller tap, thereby to compensate for the variant traveling speeds of different size taps as they are fed into or through the work.

A further and more specific object of the invention is to provide a tap driver assembly for a conventional drilling and tapping machine, comprising a cylindrical housing having means at one end for securing it to one of the drive spindles of a multiple spindle tapping machine, said cylindrical body having a sleeve fixed therein provided at its upper end with an enlarged bore extending the major portion of the length of said sleeve, and terminating at its lower end in a reduced guide bore, and an elongated tap driving element being mounted for reciprocal movement in said guide bore and having a reduced extension at its upper end forming an annular seat for an abutment member having one end of an enlarged spring seated thereon, the opposite end of said spring being seated against a fixed element at the upper end of the enlarged bore; and a relatively smaller spring being coiled about the reduced end portion of said tap driving element and having its lower end seated on said abutment and having its upper end engaged with a seat at the upper end of said reduced end portion; said smaller spring functioning to permit the relatively larger tap to be pulled downwardly into and through the work in advance of the relatively smaller tap, thereby compensating for the differential in the axial travel of two or more taps during each tapping operation caused by variations in the thread pitch or leads.

A further object of the invention is to provide a simple inexpensive tap driver assembly of the class described which may be manufactured at low cost, and by the use of which a conventional multiple spindle drilling and tapping machine may readily be adapted for simultaneously tapping a plurality of holes having different thread pitches or leads.

These and other objects of the invention and the means for their attainment will be more apparent from the following description taken in conjunction with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

FIGURE 2 is a view on an enlarged scale showing two tap driver assemblies supporting two different size taps, one of said assemblies being shown in longitudinal section to more clearly illustrate the interior construction thereof, and the two taps being shown about to engage a work piece;

Figure 4:
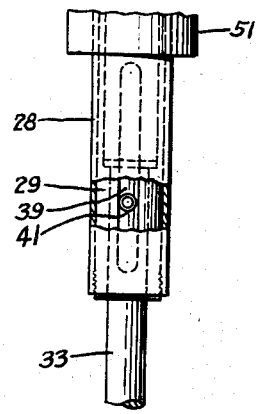

FIGURE 3 is a view similar to FIGURE 2, but showing the two taps having passed through the work piece, and showing the relatively smaller spring within the cylindrical body of the tap driver assembly carrying the larger tap, as being partially compressed because of the relatively greater axial movement of the larger tap through the work piece caused by the relatively greater pitch or lead of its thread;

FIGURE 4 is a fragmentary view showing the means provided for preventing relative rotation of the tap supporting element within the cylindrical body and sleeve of the tap driver assembly.

Figure 1:
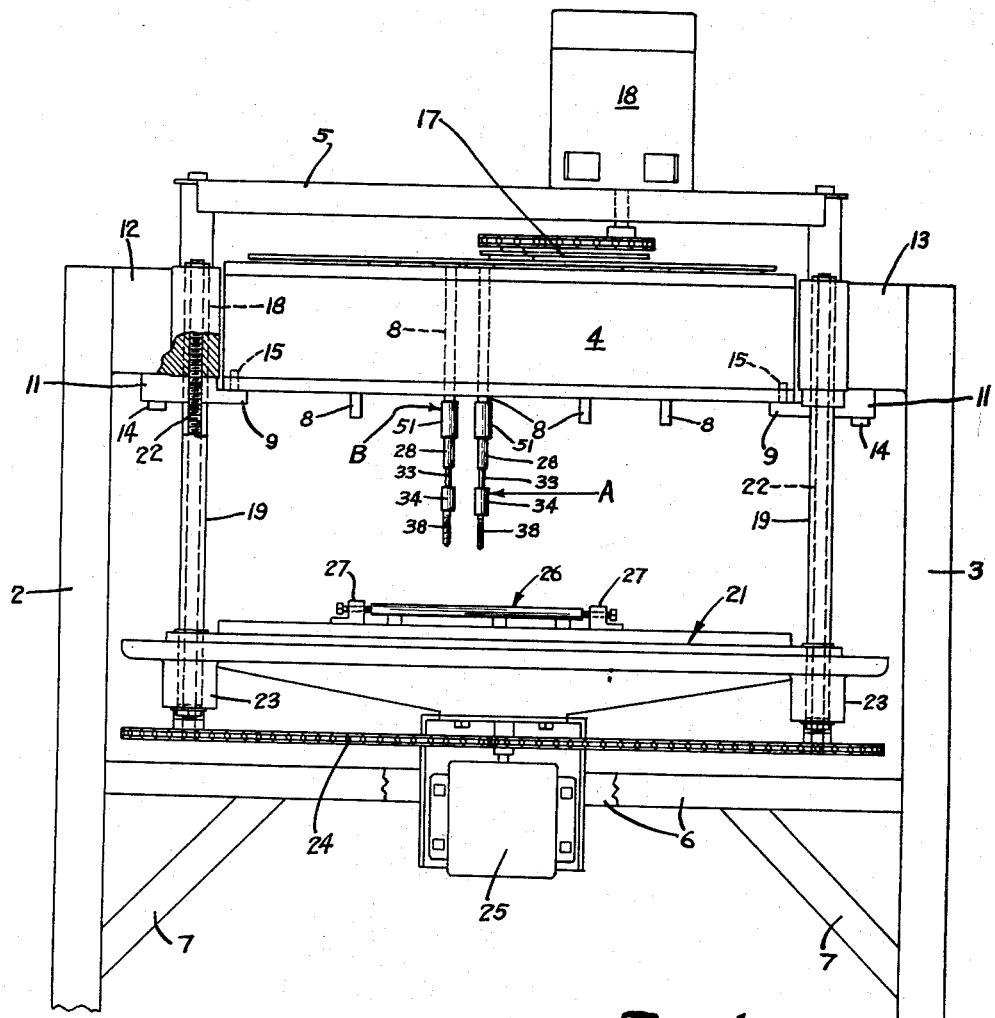
FIGURE 1 is a view showing the outline of the upper portion of a conventional multiple drilling and tapping machine with the invention applied thereto.

In the selected embodiment of the invention herein disclosed, there is illustrated in FIGURE 1, for purposes of disclosure, the outline of the upper portion of a conventional multiple spindle drilling and tapping machine, comprising a main supporting frame including upright side frame members 2 and 3, a spindle supporting head, generally designated by the numeral 4, and upper and lower cross members 5 and 6. Cross members 6 have their opposite ends fixedly secured to the upright frame members 2 and 3 by suitable means such as welding, and diagonal braces 7 are preferably provided for rigidly bracing the composite frame, as will be understood.

The spindle-supporting head 4 and the means for driving the tool driving spindles 8 mounted therein are of conventional construction, and well known in the art, and therefore need not be shown and described in detail. Suffice it to say that the head 4 may be detachably supported upon a pair of inwardly extending ledges 9—9 provided by a pair of brackets 11—11, shown secured to inwardly extending frame portions 12 and 13 provided, respectively, on the upper ends of the side frame members 2 and 3, as best shown in the upper portion of FIGURE 1. Brackets 11—11 are shown secured to frame portions 12 and 13 by such means as bolts 14. Dowels 15, indicated in dotted lines in FIGURE 1, may be provided for accurately spotting or locating the head 4 upon the ledges 9—9, when the head is positioned thereon.

The tool-driving spindles 8 of the head 4 have their upper ends operatively connected to a suitable driving mechanism, designated by the numeral 17, which may be driven by such means as an electric motor 18. The spindles 8 are detachably mounted in the head 4, whereby the number of spindles 8 depending from head 4 may readily be varied in accordance with the requirements of each particular job. The spindles 8 are usually driven at the same speed.

Slidably mounted in suitable guide ways 18 provided in the inwardly offset portions 12 and 13 of the machine frame are a plurality of spaced parallel guide rods 19, having a work-supporting table, generally designated by the numeral 21, secured to the lower ends thereof for direct movement therewith. A plurality of vertically disposed feed screws 22 have their lower end portions rotatably mounted in bearings 23 provided at the ends of the work table 21. The feed screws 22 may be driven by a chain drive 24 which, in turn, is driven by a suitable power unit 25, such as an electric motor. Motor 25 is preferably suspended from the work-table 21, whereby it is vertically movable therewith during each drilling or tapping operation. The work, indicated at 26 in FIGURE 1, is detachably and adjustably secured to the work-table by suitable means, shown at 27 in FIGURE 1, as is well-known in the art.

In the usual operation of a conventional multiple spindle drilling and tapping machine, the mechanic may be confronted with a job requiring tapping a plurality of holes having different size threads. For example, some holes may require a size 14–24 thread, and others a relatively coarser thread, as a 24–16 thread. As the thread pitch or lead determines the axial or feeding movement of the tap into the work piece, it is obvious that a tap having a relatively fine pitch thread will travel through a work piece at a relatively slower rate of speed than one having a coarser thread, assuming, of course, that the two taps are driven at the same rotative speed. Heretofore, it has been possible to tap a plurality of holes at one time, provided the same size taps were used for all holes. It has not been possible to simultaneously tap a plurality of holes with different pitch threads because of the differential in the feeding travel of the different size taps, when driven at the same speed.

The present invention provides means whereby two or more holes requiring different size threads may be tapped at one time, even when the tapped holes vary in diameter and number of threads per inch, thus making it possible to expedite the tapping operation of each job requiring two or more different size tapped holes.

To illustrate the invention, two tap driver assemblies, generally designated by the reference characters A and B, are shown attached to two of the drive spindles 8 of a multiple spindle tapping machine. See FIGURE 1. Tap driver assembly A is shown provided with a tap as, for example, a size 14–24, whereas tap driver assembly B is shown provided with a relatively larger tap as, for example, a size 24–16. As the two tap driver assemblies are identical in construction, with the exception of the taps, but one will be described in detail.

Each tap driver assembly comprises an elongated tubular housing 28 having a sleeve member 29 mounted therein. Sleeve member 29 has an enlarged axial bore 30 extending downwardly from its upper end the major portion of its length, and terminates in a reduced bore 31 at its lower end. An annular shoulder or seat 32 is provided between bores 30 and 31.

An elongated tap supporting rod-like member 33 is slidably received in bore 31, and has a coupling member 34 secured to its lower end by such means as a set screw 35. Coupling member 34 has an axial bore 36 therein adapted to receive the shank portion 37 of a conventional tap 38, secured in bore 36, as shown in FIGURES 2 and 3.

Diametrically opposed elongated slots 39 are provided in the eye wall of sleeve member 29, adapted to receive the terminals of a pin 41, secured in a transverse aperture provided in the upper end portion of the tap supporting member 33. Pin 41 is vertically slidable in slots 39 and prevents relative rotation of member 33 with respect to sleeve 29.

The upper end of member 33 terminates in a reduced extension 42 having a small spring 43 coiled thereabout, the lower end of which is seated upon an abutment washer 44, seated on shoulder 32 of sleeve member 29. The upper end of spring 43 is engaged with a washer 45 secured to the upper end of the reduced extension 42 by means as a nut 46.

The abutment washer 44 is normally seated upon the annular shoulder 32 of sleeve member 29, and also supports the lower end of a relatively larger spring 47, received within sleeve member 29 and which completely encircles the smaller spring 43. The upper end of spring 47 is shown seated against a transversely disposed pin 48 received in aligned apertures provided in the walls of housing 28 and sleeve member 29. Spring 47 constantly urges the tap supporting spindle 33 in a downward direction to normally retain the abutment washer 44 upon the annular seat within the sleeve member 29. The upper end portion of the tubular housing 28 is shown received in a bore 49 provided in a coupling member 51, detachably secured to one of the drive spindles 8 of the tapping machine by such means as set screws 52. A similar set screw 53 secures the housing 28 in the bore 49 of the coupling member 51, whereby all parts rotate as a unit with the drive spindle 8.

When two or more holes of different diameters are to be tapped simultaneously, and said holes require different size threads, the work piece is first secured to the work table, as shown in FIGURE 1. The required number of tap driver assemblies A, B, etc., are then secured to their respective tap driver spindles 8 of the machine head 4 in accordance with the number and location of the tapped holes to be made in the work piece.

When the tap driver assemblies are in their normal relaxed positions, as shown in FIGURE 2, the relatively larger spring 47 is fully extended, whereby the abutment washer 44 is firmly seated against the annular shoulder or seat 32 of sleeve member 29, as clearly illustrated in FIGURE 2. The relatively smaller spring 43 is also fully extended.

When the tap driver assemblies have been properly positioned in the machine head 4, the work piece 26 is moved upwardly into engagement with the bottom ends of the taps as will be understood by reference to the arrow in FIGURE 2. As a result of the relatively slower thread-cutting speed for the smaller tap because of its smaller pitch lead, the leading end of the smaller tap is usually positioned relatively closer to the work piece upon initial starting of the tapping operation, as indicated in FIGURE 2, whereby the small tap will start its tapping operation in advance of the relatively coarser tap, shown on tap driver assembly B.

As the smaller tap gradually feeds into the work piece, the relatively larger tap subsequently engages the work piece and begins its thread-cutting action which, because of its relatively greater pitch or thread lead, will travel through the work at a relatively faster rate of speed than the smaller tap of tap driver assembly A. The abutment washers 44 of tap driver assemblies A and B are forced out of engagement with their annular seats 32, when the taps are initially pressed into tapping engagement with the work piece, and remain so during the tapping operation, as shown at 40 in FIGURE 3.

In operation, the work piece is fed upwardly into engagement with the taps at a rate of speed substantially equal to or slightly faster than the thread-cutting speed of the smaller tap so that the smaller tap may complete its tapping operation by the time the relatively larger coarser tap completes its tapping operation.

When all of the taps are driven simultaneously and at the same rotative speed, as herein disclosed, the feeding speed of the work piece into engagement with the taps is determined largely by the axial feeding movement of the smaller tap through the work piece. This may cause the larger faster cutting tap to complete its tapping operation in advance of the smaller tap because of its greater pitch lead. When this occurs, the relatively larger tap is pulled downwardly into the work piece a relatively greater distance than the smaller tap, as indicated in FIGURE 3, whereby the shoulder 33' of its supporting shank or member 33 is pulled away from the abutment washer 44, as shown at 54 in FIGURE 3. This causes the relatively smaller spring 43 of the larger tap assembly to compress and thus compensate for the differential in the axial movements of the different taps.

It will thus be seen that the smaller springs 43 have an important function in that they make it possible to simultaneously tap a plurality of holes of different sizes in a given work piece at the same time, and without danger of damaging the taps or the work piece as a result of some of the taps completing their tapping operations in advance of others. When each complete tapping operation has been completed, and the taps are to be retracted from the work piece, the operator reverses the rotation of the taps in the usual manner, whereupon springs 43 and 47 in the upper end portion of each tap driver assembly will return to their normal extended positions, as shown in FIGURE 2, and will remain in such positions until the taps are again engaged with a work piece.

Thus, it will be noted that the larger taps, because of their relatively faster feeding movement through the work piece, caused by their relatively greater thread lead, may cause their respective tap supporting shanks 33 to relatively move downwardly in their respective housings, as indicated at 54 in FIGURE 3. The thickness of the work piece may also determine to some extent the pull-down action of the tap supporting spindle 33 of each tap driver assembly.

The novel tap driver assembly herein disclosed has been found to be extremely practical and efficient in actual operation. It has also made it possible to simultaneously tap a plurality of holes of different diameters having different thread leads, thereby greatly expediting the operation of tapping a plurality of different sized holes in a given work piece. The tap driver assembly may also be utilized as an attachment to a conventional multiple spindle tapping machine, and if desired, they may be used independently of one another.

In the foregoing, the tap driver assemblies have been described as being operated by an electric motor. It is to be understood that other forms of power means may be utilized for simultaneously driving the spindles during each tapping operation without departing from the scope of the invention. In like manner, the power means utilized for raising and lowering the work piece may also be varied, as desired, to suit conditions.

It is apparent that many modifications and variations of the invention as hereinbefore set forth may be made without departing from the spirit and scope thereof. The specific embodiments described are given by way of example only and the invention is limited only by the terms of the appended claims.

We claim:

1. A tap driver assembly comprising an elongated tubular body having means at one end for attaching it to the drive spindle of a multiple spindle tapping machine, a sleeve inserted into said tubular body and extending substantially the length theerof, said sleeve having an enlarged bore at its upper portion extending downwardly therefrom and terminating at its lower end in an annular shoulder, a reduced bore extending from said annular shoulder to the lower end of said body, an elongated tap-supporting member mounted for relative axial movement in said reduced bore and having means at its lower end for detachably securing a tap thereto, said sleeve having longitudinally extending slots in the wall thereof, a transverse pin secured to said elongated member and having its terminals projecting into the elongated slots in the wall of the sleeve whereby said elongated member cannot rotate relative to the sleeve, said elongated tap-supporting member having a reduced extension at its upper end extending into said enlarged bore and defining an annular shoulder on said elongated member, an abutment element normally seated on said annular shoulders of said sleeve and said elongated member, said reduced extension of said tap-supporting member extending upwardly through an aperture in said abutment element, a first spring having its lower end seated on said abutment element and having its upper end seated against fixed means in the upper end of said enlarged bore, said first spring constantly urging said elongated member downwardly with a yielding pressure thereby to hold the tap secured thereto in thread-cutting engagement with a work piece moved into tapping engagement with the tap, a second spring encircling the reduced extension of said elongated tap-supporting member, said second spring having its lower end seated on said abutment element and having its upper end seated against fixed means at the upper end of said reduced extension, said second spring functioning when two or more taps having different thread leads are operated simultaneously at the same rotational speed to permit the shoulder on the upper end of the tap-supporting member to be pulled downwardly away from said abutment element as a result of the relatively faster feeding action of one of the taps into the work because of its greater pitch lead, thereby temporarily placing said second spring under compression whereby it may return the tap-supporting member to its normal position against the abutment element when the taps are retracted from the work piece.

2. A tap driver assembly comprising an elongated tubular body having means at one end for attaching it to a drive spindle of a multiple spindle tapping machine, said tubular body having an enlarged bore in its upper portion extending downwardly therefrom and terminating at its lower end in an annular shoulder, a reduced bore extending from said annular shoulder to the lower end of said body, an elongated tap-supporting member mounted for relative axial movement in said reduced bore and having means at its lower end for detachably securing a tap thereto, said elongated tap-supporting member having a reduced extension at its upper end extending into said enlarged bore and defining an annular shoulder on said elongated member, an abutment element normally seated on said shoulders, a first spring having its lower end seated on said abutment element and having it upper end seated against fixed means in the upper end of said enlarged bore, a second spring of lesser diameter lying within the first spring and encircling the reduced extension of said elongated tap-supporting member, said second spring having its lower end seated on said abutment element and having its upper end seated against fixed means in the upper end of said reduced extension, means for preventing relative rotation of said tap-supporting member in said body, said first spring serving to hold the tap against a work piece when initially starting each tapping operation and permitting said elongated tap-supporting member to be axially translated in said housing in the event the feeding movement of the work piece into tapping engagement with said tap varies from the pitch lead of the thread being cut, and said second spring exerting an upward thrust against the tap-supporting member when the annular shoulder on the tap-supporting member drops below the annular shoulder in the bottom of the enlarged bore in said tubular body.

3. A tap driver assembly according to claim 2 further characterized in that a sleeve is inserted into said tubular body and extends substantially the length thereof, said enlarged bore annular shoulder and reduced bore of said tubular body are in said sleeve, said means for preventing relative rotation of said tap-supporting member comprises longitudinally extending slots in the wall of said sleeve and a transverse pin secured to said elongated tap-supporting member and having its terminals projecting into the elongated slots in the wall of the sleeve.

References Cited in the file of this patent

UNITED STATES PATENTS

| | | |
|---|---|---|
| 1,458,948 | Meyer | June 19, 1923 |
| 1,936,665 | Gauthier | Nov. 28, 1933 |
| 2,104,435 | Noel | Jan. 4, 1938 |
| 2,399,966 | Welch | May 7, 1946 |
| 2,772,094 | Jamilkowski et al. | Nov. 27, 1956 |